No. 657,613. Patented Sept. 11, 1900.
E. PIERREPONT.
ARTIFICIAL TOOTH.
(Application filed May 26, 1898.)
(No Model.)
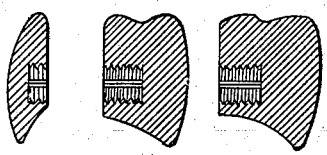
*Fig.1.*
*Fig:2.*
        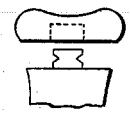
*Fig:3.*    *Fig:4.*    *Fig:5.*
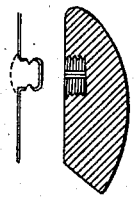    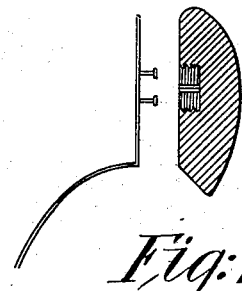
*Fig:6.*    *Fig:7.*
Witnesses
Edwin Drew Bartlett.
Frank J. Ames.
Inventor
Evelyn Pierrepont.
per
Herbert Sefton-Jones
Attorney

UNITED STATES PATENT OFFICE.

EVELYN PIERREPONT, OF LONDON, ENGLAND.

ARTIFICIAL TOOTH.

SPECIFICATION forming part of Letters Patent No. 657,613, dated September 11, 1900.

Application filed May 26, 1898. Serial No. 681,824. (No model.)

*To all whom it may concern:*

Be it known that I, EVELYN PIERREPONT, a subject of the Queen of Great Britain, residing at Bank Chambers, Cockspur street, London, England, have invented a certain new and useful Improved Attachment for Artificial Teeth; and I do hereby declare that the following is a full, clear, and exact description of the same.

My invention relates to an improvement in mineral teeth of that type in which the teeth possess an internal recess, whereby they are secured to the plate or backing. The said improvement is also equally applicable to the attachment of portions of teeth, such as crowns, to their supports.

The method of attaching artificial teeth to the backing or plate support by forming such teeth with a basal cavity adapted to receive projections from the plate or support and so formed that the said teeth can be firmly secured on the said projections, thus avoiding the necessity for having pins or the like fixed in the said teeth before baking, is already known; but such teeth, constructed as hitherto known have not proved entirely satisfactory in use and are only capable of application instead of the ordinary pin-teeth to a limited extent.

My invention consists, essentially, in molding within a cavity in a plastic tooth or crown a spiral or other thread and in forming a keyway or slot or more than one such through the thread thus molded in the interior of the tooth. The tooth after molding in this form internally is then furnaced in the well-known manner and is ready for use.

My invention not only provides a tooth having as strong and reliable a means of attachment to the plate as in the present system, but it also enables me to attach the tooth to positions in either metal or vulcanite dental plates from which pin-teeth have been broken off, and this without refiring or revulcanizing the plate. Moreover, in the case of flat teeth the backs or supports can be soldered to the base-plate and the mineral teeth afterward attached, thus making it unnecessary to refire the teeth, as would be requisite in the case of ordinary front teeth.

In the case of crowns on gold or other sockets I attain the great advantage that I can provide a crown which is capable of being ground or reduced in thickness when requisite instead of being, like the ordinary gold crown, incapable of alteration after it is once fixed in place. Also in "bridgework" it is possible to fix the teeth in place without shifting the bridge.

To fix my improved flat back teeth in place, I prefer to form a boss or projection upon the backing or supporting-plate by punching or otherwise raising the surface or by soldering a projection thereon. This projection, however produced, is then preferably slotted or undercut on two sides at least, so as to give a better hold. The recess in the tooth being filled with a suitable cement is then placed over the projection and the tooth pressed into its place. As soon as the cement has set the tooth will be firmly fixed. In cases where pins are used the free ends of the pin or pins are also preferably headed, threaded, or grooved. The free space between the pin or pins and the aperture in the tooth is then filled with a suitable material, which completely closes the recess and beds firmly around the pins. When the cement has set, the pins are held quite as firmly in the tooth as if they had been furnaced into it, and there is no possibility of the pin unwinding, together with the block of cement, and thus becoming loosened, because the keyway or slot or slots in the threading prevents any rotary motion of the tooth upon the pin or pins.

In order to make my invention more clear, I have illustrated the same in the accompanying drawings, in which I have represented, in—

Figure 1, flat teeth in three modifications, showing the aperture for attachment at the back; Fig. 2, shoulder-teeth for vulcanite plates with the aperture at the back; Fig. 3, a section of a front tooth for the lower jaw with the aperture at the base; Fig. 4, a similar section of a front tooth for the upper jaw; Fig. 5, a section of a metal collar with stud on top for detachable mineral crown, showing attachment in base; Figs. 6 and 7, diagrams of attachment of teeth to backing by means of a projection or pins, respectively.

The application of my invention to the different patterns of teeth will be obvious from the foregoing description and the drawings. It is desirable as much as possible to place the support along the line of greatest resistance to the pressure on the tooth. Thus the basal position shown in Figs. 3 and 4 is inclined at an angle coinciding with the line of pressure upon the gum.

One great advantage of my improved construction of teeth is that they may be used for repairing sets of teeth attached to plates or dentures wherever an ordinary pin-tooth has been broken away from its support, leaving the pins in place. In such a case a tooth of my construction can easily be slipped over the projecting pins of the broken tooth and secured in place in a few minutes without any cutting or alteration of the backing. These teeth are consequently applicable for all purposes for which it has hitherto been necessary to have at least two different types of teeth.

In conclusion, I desire to state that I am aware that artificial teeth have been constructed with screw-threaded pin-holes into which the threaded pin or pins have been screwed, and I make no claim to such a method of attachment; but

What I claim is—

1. A mineral tooth having a recess spirally threaded, said threading interrupted by a slot.

2. In combination, a mineral tooth having a spirally-threaded recess, a slot interrupting said threading, a backing-plate having an undercut boss projecting into the said recess, and a filling securing the said tooth to the backing-plate.

3. In combination, a mineral tooth having a spirally-threaded recess, a slot interrupting said threading, a grooved metal projection entering the said recess, a backing-plate attached to the said metal projection, and a filling uniting the said tooth to the said projection.

In witness whereof I have hereunto set my hand in presence of two witnesses.

EVELYN PIERREPONT.

Witnesses:
 HERBERT SEFTON-JONES,
 WALTER J. SKERTEN.